United States Patent
Freiburg et al.

(10) Patent No.: US 8,340,186 B2
(45) Date of Patent: Dec. 25, 2012

(54) METHOD FOR INTERPOLATING A PREVIOUS AND SUBSEQUENT IMAGE OF AN INPUT IMAGE SEQUENCE

(75) Inventors: Volker Freiburg, Stuttgart (DE); Oliver Erdler, Ostfildern (DE)

(73) Assignee: SONY Deutschland GmbH, Berlin (DE)

( * ) Notice: Subject to any disclaimer, the term of this patent is extended or adjusted under 35 U.S.C. 154(b) by 1133 days.

(21) Appl. No.: 12/293,427

(22) PCT Filed: May 9, 2007

(86) PCT No.: PCT/EP2007/004108
§ 371 (c)(1),
(2), (4) Date: Sep. 18, 2008

(87) PCT Pub. No.: WO2007/131688
PCT Pub. Date: Nov. 22, 2007

(65) Prior Publication Data
US 2009/0278991 A1    Nov. 12, 2009

(30) Foreign Application Priority Data

May 12, 2006    (EP) .................................... 06009881

(51) Int. Cl.
*H04N 7/12* (2006.01)
(52) U.S. Cl. ......... 375/240.16; 375/240.01; 375/240.12; 375/240.17; 348/699
(58) Field of Classification Search ................. 348/699; 375/240.16, 240.17, 240.12, 240.01
See application file for complete search history.

(56) References Cited

U.S. PATENT DOCUMENTS

| | | | | |
|---|---|---|---|---|
| 5,315,171 A | * | 5/1994 | Blauer et al. | 327/71 |
| 5,394,196 A | * | 2/1995 | Robert | 348/699 |
| 5,455,629 A | * | 10/1995 | Sun et al. | 375/240.27 |
| 6,097,520 A | * | 8/2000 | Kadnier | 398/106 |
| 6,185,340 B1 | * | 2/2001 | Comer | 382/236 |
| 6,219,436 B1 | | 4/2001 | De Haan et al. | |
| 6,487,313 B1 | | 11/2002 | De Haan et al. | |
| 6,900,846 B2 | | 5/2005 | Lee et al. | |
| 2003/0086498 A1 | * | 5/2003 | Lee et al. | 375/240.16 |

(Continued)

FOREIGN PATENT DOCUMENTS

EP    0 648 047    4/1995

(Continued)

OTHER PUBLICATIONS

Sanz—Image Technology (p. 373, section 3.2, a combined morphological dilation and closing operation that enlarges the spatial areas, ISBN—3-540-58306-8), 1996.*

(Continued)

*Primary Examiner* — Thanhnga B Truong
*Assistant Examiner* — Shan Elahi
(74) *Attorney, Agent, or Firm* — Oblon, Spivak, McClelland, Maier & Neustadt, L.L.P.

(57) ABSTRACT

A method for interpolating a previous and subsequent image of an input image sequence, including: determining fidelity information for at least one motion vector that is descriptive for motion between a previous and subsequent image, wherein the fidelity information is descriptive for the level and accuracy of the motion, determining classification information for the at least one motion vector, wherein the classification information depends on the fidelity information, the classification information being descriptive for the motion type of the motion, and selecting an interpolation method in dependence of the determined classification information.

37 Claims, 3 Drawing Sheets

U.S. PATENT DOCUMENTS

2006/0072790 A1     4/2006    Wittebrood et al.

FOREIGN PATENT DOCUMENTS

| | | | |
|---|---|---|---|
| EP | 648047 | A2 * | 4/1995 |
| EP | 648047 | A2 * | 4/1995 |
| EP | 0 903 946 | | 3/1999 |
| WO | WO 92/05662 | | 4/1992 |
| WO | WO 99/22520 | | 5/1999 |
| WO | 00 11863 | | 3/2000 |
| WO | WO 0011863 | A1 * | 3/2000 |
| WO | WO 02/49365 | A2 | 6/2002 |
| WO | 2004 066624 | | 8/2004 |
| WO | WO200406624 | A1 * | 10/2004 |
| WO | WO2004066624 | A1 * | 10/2004 |

OTHER PUBLICATIONS

Olukayode Anthony Ojo, et al., "Robust Motion-Compensated Video Upconversion", IEEE Transaction on Consumer Electronics, vol. 43, No. 4, Nov. 1997, pp. 1045-1056.

Dang-Jiang Wang, et al., "A New Approach to Video Format Conversion Using Bidirectional Motion Estimation and Hybrid Error Concealment", Journal of Information Science and Engineering, vol. 17, 2001, pp. 763-777.

\* cited by examiner

METHOD FOR INTERPOLATING A PREVIOUS AND SUBSEQUENT IMAGE OF AN INPUT IMAGE SEQUENCE

TECHNICAL FIELD

The invention relates to a method for interpolating a previous and subsequent image of an input image sequence. Further, the invention relates to a signal processing system, a computer program product, a computer readable storage medium and a signal processing means for interpolating a previous and subsequent image of an input image sequence.

BACKGROUND

Figure 1:
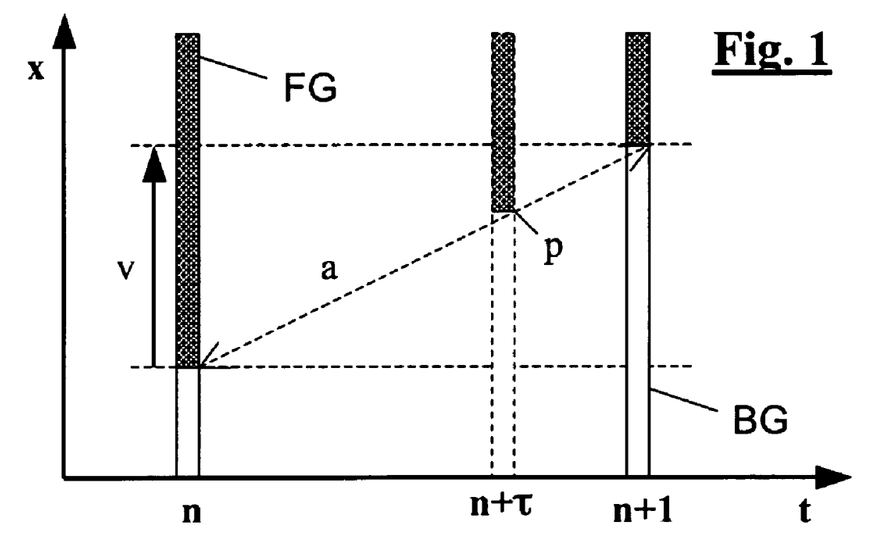
FIG. 1 shows a diagram illustrating interpolation of two images where the motion vector could be determined accurately.

It is generally desirable to improve the perceptual image quality of interpolated images produced by a motion compensation system. A typical motion compensation system consists of two major building blocks. The first block is the motion estimation process that produces a motion vector field, which describes the local displacement of image parts estimated from two images at distinct but usually adjacent points in time. The estimated motion vector information is then used by the interpolation process to displace those image parts in motion by a fractional amount τ that represents the intermediate temporal position of the image to be interpolated. FIG. 1 depicts this situation for a one-dimensional image containing a still background object BG and a moving foreground object FG. The displacement of the border between BG and FG from time n to time n+1 is given by the vector v. To properly interpolate an image at time n+τ, the vector v has to be scaled by factor τ to find the interpolated position of the border between BG and FG. The line a denotes the access position in the previous and next images at time index n and n+1 respectively, where the image parts at those positions are used in a filtering process to produce the interpolated image part at point p.

Figure 2:
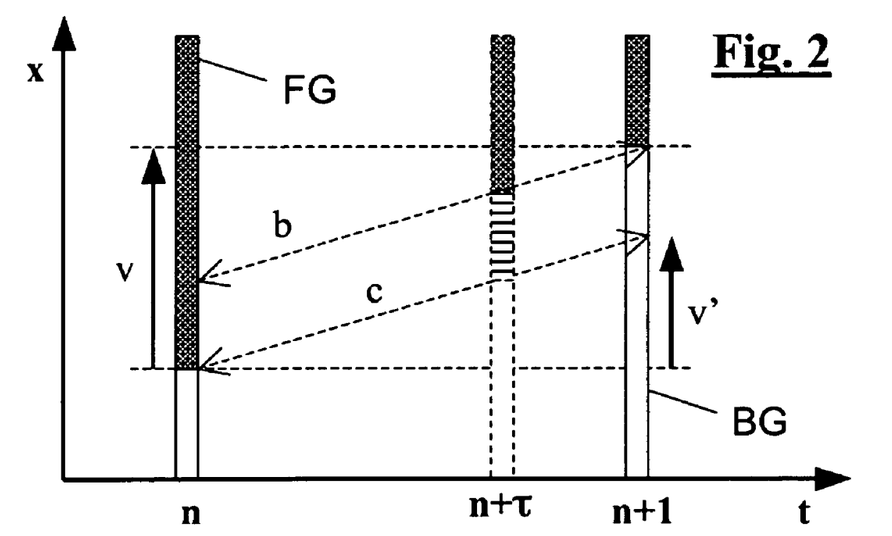
FIG. 2 shows a diagram illustrating interpolation of two images where the motion vector could not be determined accurately.

The interpolation process will however not reproduce the proper border between objects BG and FG if the estimated motion vector v, for some reason, does not reflect the actual motion of object FG. This situation is visualized in FIG. 2, where the motion estimation results in the wrong vector v' instead of the correct vector v. As a consequence, the border between the two objects includes now a transition area between the access lines b and c, and the interpolation process will be based on a mix of foreground and background areas. In general, this constellation will result in the border area not being properly constructed and therefore decrease the perceptual quality of the interpolation result.

The reasons for the failure of the motion estimation process can be manifold. They are related to the principle of motion estimation itself or due to implementation related constraints. Prominent causes for failing motion estimation are:

When a foreground object depicted in an image sequence moves over a background object, then parts of the background occluded by the foreground in the previous image will be exposed in the next image. Contrary, parts of the background image exposed in the previous images might be occluded by the foreground object when it moves over those parts. Most motion estimation processes still try to estimate a motion vector for those occlusion and exposure areas. This is however prone to error, because the information used in the matching process is only present in either the previous or the next image.

If the matching process has determined several candidates for the displacement vector, all of them resulting in equally good matches with respect to the matching criterion, the finally assigned vector might be a random selection from the set of candidates. This situation arises in case of uniform image areas or areas containing a repetitive pattern or texture.

While the problems incurred by an imperfect motion estimation process cannot be cured for the reasons given above, it is an objective of the proposed method to decrease the visibility of those effects in the interpolation result, and thus improve the perceptual quality of the motion compensation. It is another objective of the proposed method to achieve this result with an efficient approach that is suitable for implementation in an integrated circuit. In other words, it is an objective to provide a signal processing means that can decrease the visibility of effects incurred by imperfect motion estimation in the interpolation result, and thus improve the perceptual quality of the motion compensation, wherein the resources in terms of needed computing time and memory is kept at a minimum.

SUMMARY OF THE INVENTION

In order to solve this problem, the present invention provides a method for interpolating a previous and subsequent image of an input image sequence according to claim 1. Further, the present invention provides a signal processing system, a computer program product, a computer readable storage medium and a signal processing means according to claims 20, 21, 22, and 23, respectively. Preferred embodiments of the present invention are defined dependent claims.

The invention provides a method for interpolating a previous and subsequent image of an input image sequence, comprising a step of determining fidelity information for at least one motion vector which is descriptive for motion between, i.e. within, said previous and subsequent image, wherein said fidelity information is descriptive for the level and accuracy of said motion. The level of said motion describes the complexity, magnitude and/or absolute value of said motion. The level of motion therefore can also be seen as the complexity of the motion. Complex motion is defined as non-uniform motion combined with fast occlusion or exposure of depicted moving scene objects. The accuracy of said motion corresponds to the estimated accuracy which can e.g. be derived from the residual error (cf. below). The method further comprises a step of determining classification information for said at least one motion vector, wherein said classification information depends on said fidelity information, wherein said classification information is descriptive for the motion type of said motion. For example, said classification information may be descriptive for the visibility of image blocks in said previous image with respect to said subsequent image or vice versa. The method further comprises a step of selecting an interpolation method in dependence of the determined classification information. This interpolation method is then used to interpolate said previous and subsequent image in order to obtain an interpolated image. For example said previous image may correspond to a time n and said subsequent image corresponds to a time n+1. Then, said interpolated image may correspond to a time n+τ. The time n+τ in this example lies between the time n and n+1. Said fidelity information is useful to decide about the utility, i.e. the usefulness or serviceableness or benefit, of the motion vector for motion compensation within the interpolated image. If e.g. said fidelity information indicates a low fidelity, then the motion vector is considered not to be very useful, whereas when said fidelity information indicates a high fidelity, then this indicates that the corresponding motion vector is useful for compensating motion in said interpolated image.

Thus, an enhancement for a motion compensation system/method is proposed, that identifies problematic image areas containing potential complex motion. The identified areas are then interpolated with an alternative robust method different from the interpolation method used for uniform motion areas to perceptually optimize the interpolation result.

It is possible, that a residual error is determined for each motion vector, and said fidelity information is determined based on said residual error and corresponding motion vector.

It is also possible, that said fidelity information corresponds to 1 Bit of information. In this case the needed amount of memory is very low.

It is also possible, that said fidelity information takes on the value "unstable" if the magnitude of the corresponding motion vector exceeds a first threshold and the corresponding residual error exceeds a second threshold, and otherwise takes on the value "stable".

It is further possible to additionally perform the following steps:
projecting said motion vector to an interpolation position corresponding to an interpolated image which lies between said previous and subsequent image in order to obtain a projected motion vector determining said classification information based on said projected motion vector.

It is further possible to additionally perform the following steps:
projecting said fidelity information to said interpolation position in order to obtain projected fidelity information, and
determining said classification information based on said projected fidelity information.

It is also possible that said classification information takes on one of the following motion classification values, each representing a certain motion type:
"normal", in which case said motion vector describes unambiguous motion of an image block that is visible in said previous image and in said subsequent image,
"occlusion", in which case said motion vector describes motion of an image block that is visible only in said previous image and occluded in said subsequent image,
"exposure", in which case said motion vector describes motion of an image block that is not visible in said previous image and exposed in said subsequent image,
"unknown", in which case said motion vector describes motion that cannot be identified as "normal", "occlusion", or "exposure".

It may be that said classification information is filtered classification information that is determined by filtering unfiltered classification information which is descriptive for the motion type of said motion.

It may also be that said filtering of said unfiltered classification information comprises determining combined fidelity information which depends on said unfiltered classification information, said projected fidelity information and/or said projected motion vector.

It is also possible that said combined fidelity information takes on the value "unstable" if
said projected fidelity information has the value "unstable" or
said projected motion vector corresponds to the null vector representing no motion and the motion classification value of said unfiltered classification information is different from "normal", or
the motion classification value of horizontally and vertically adjacent motion vectors have the value "unknown" or conflicting opposite values "occlusion" and "exposure", and
otherwise takes on the value "stable".

It is further possible that said combined fidelity information is filtered in order to obtain filtered fidelity information, wherein said filtering of said combined fidelity information comprises a combined morphological dilation and closing operation that enlarges the spatial areas marked with value "unstable".

Thereby, said filtering of said unfiltered classification information may comprise multiplexing said unfiltered classification information and constant motion classification information having the motion classification value "unknown" in order to obtain multiplexed classification information, wherein said multiplexing is depending on said filtered fidelity information and/or on said combined fidelity information.

Said multiplexed classification information may equal to said unfiltered classification information if said filtered fidelity information has the value "stable" and otherwise be equal to said constant motion classification information.

It is further possible to additionally perform the following steps when filtering said unfiltered classification information:
determining the motion classification value with majority occurrence within a spatially defined neighborhood around each spatial position corresponding to said at least one motion vector, and
setting said filtered classification information to the determined motion classification value with majority occurrence.

It is further possible to additionally compensate motion based on a filtered motion vector which is determined by:
selecting a subset of neighbor motion vectors of said projected motion vector wherein said neighbor motion vectors have a motion classification value equal to the motion classification value with majority occurrence, and
using said subset of neighbor motion vectors as input to an adjustment method in order to obtain said filtered motion vector.

In one embodiment said adjustment method comprises computing the individual averages for the horizontal and vertical motion vector components separately to derive the average horizontal and average vertical motion vector components, and recombining the average vector components to be interpreted as the average motion vector for each neighborhood subset.

In another embodiment said adjustment method comprises computing the individual median values for the horizontal and vertical motion vector components separately to derive the median horizontal and median vertical motion vector components, and recombining the median vector components to be interpreted as median filtered motion vector for each neighborhood subset.

In yet another embodiment said adjustment method comprises enumerating the motion vectors within said subset, in particular by vector magnitude, vector direction or the like, and usage of a rank-order filter to select the representative motion vector for said subset.

It is possible, that said method comprises a step of increasing the resolution after projecting said motion vector and/or said fidelity information.

The signal processing system of the invention is adapted for performing the method or any one of the method steps as defined and explained above.

The computer program product according to the invention comprises computer program means adapted for realizing a method for interpolating a previous and subsequent image of an input image sequence as defined above and/or the steps thereof, when it is executed on a computer, a digital signal processing means, and/or the like.

The computer readable storage medium comprises a computer program product as defined above.

A signal processing means for interpolating a previous and subsequent image of an input image sequence, comprises:
- a fidelity detection unit adapted for determining fidelity information for at least one motion vector which is descriptive for motion between said previous and subsequent image, wherein said fidelity information is descriptive for the level and accuracy of said motion,
- a filtering unit adapted for determining classification information for said at least one motion vector, wherein said classification information depends on said fidelity information, said classification information being descriptive for the motion type of said motion, and
- an interpolation unit adapted for selecting an interpolation method in dependence of the determined classification information.

The signal processing means may also comprise a motion estimation unit adapted for determining a residual error for each motion vector, wherein said fidelity information is determined based on said residual error and corresponding motion vector.

Said signal processing means may also comprise a projection unit adapted for projecting said motion vector to an interpolation position corresponding to an interpolated image which lies between said previous and subsequent image in order to obtain a projected motion vector, wherein said filtering unit is further adapted for determining said classification information based on said projected motion vector.

It is possible that said projection unit is adapted for projecting said fidelity information to said interpolation position in order to obtain projected fidelity information and said filtering unit is adapted for determining said classification information based on said projected fidelity information.

It is possible that said classification information is filtered classification information and said filtering unit is adapted for filtering unfiltered classification information which is descriptive for the motion type of said motion in order to obtain said filtered classification information.

It is further possible that said filtering unit is adapted for determining combined fidelity information which depends on said unfiltered classification information, said projected fidelity information and/or said projected motion vector.

It is also possible that said filtering unit is adapted for filtering said combined fidelity information in order to obtain filtered fidelity information, wherein said filtering of said combined fidelity information comprises a combined morphological dilation and closing operation that enlarges the spatial areas marked with value "unstable".

Said signal processing means may also comprise a multiplexing unit adapted for multiplexing said unfiltered classification information and constant motion classification information having the motion classification value "unknown" in order to obtain multiplexed classification information, wherein said multiplexing is depending on said filtered fidelity information and/or on said combined fidelity information.

It is possible that said multiplexing unit is controlled such that said multiplexed classification information is equal to said unfiltered classification information if said filtered fidelity information has the value "stable" and otherwise is equal to said constant motion classification information.

Said signal processing means may also comprise an adjustment unit adapted for
- determining the motion classification value with majority occurrence within a spatially defined neighborhood around each spatial position corresponding to said at least one motion vector, and
- setting said filtered classification information to the determined motion classification value with majority occurrence.

Said interpolation unit may be adapted for compensating motion based on a filtered motion vector which is determined by said adjustment unit by
- selecting a subset of neighbor motion vectors of said projected motion vector wherein said neighbor motion vectors have a motion classification value equal to the motion classification value with majority occurrence, and
- using said subset of neighbor motion vectors as input to an adjustment method in order to obtain said filtered motion vector.

BEST MODE FOR CARRYING OUT THE INVENTION

Figure 3:
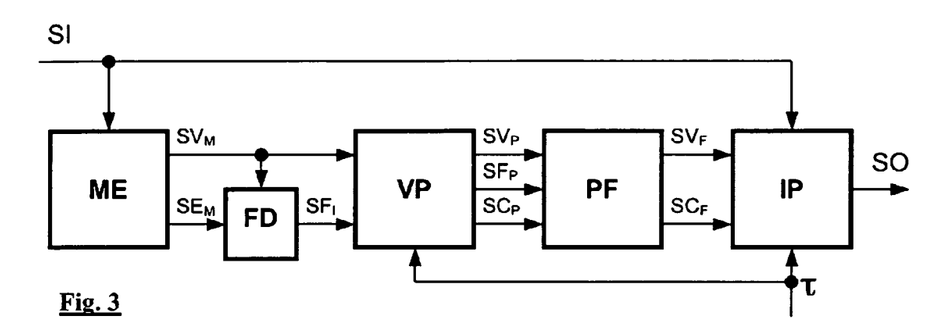
FIG. 3 shows a block diagram with processing units.

FIG. 3 depicts an embodiment of the motion compensation with improved complex motion processing. The input image sequence SI, consisting of at least two subsequent images, is analyzed by the motion estimation process ME to generate the motion vector signal $SV_M$ and corresponding residual error value signal $SE_M$ for the transition between the input images at time index n and time index n+1.

The error values $SE_M$ are combined by the vector fidelity detector FD with the motion vectors $SV_M$ to form a two-valued fidelity indicator $SF_I$ that has value "unstable" if the corresponding vector is considered to not accurately representing the motion, or "stable" if the corresponding vector is considered as properly representing the motion.

Both signals $SV_M$ and $SF_I$ are then shifted spatially by the vector projection process VP in the motion vector field according to the desired temporal position n+τ of the output frame to be interpolated. The vector projection process VP will therefore result in the projected motion vectors $SV_P$ and corresponding projected fidelity signal $SF_P$. In addition, a four-valued motion classification signal $SC_P$ is generated that defines for each motion vector in $SV_P$ the corresponding motion type.

The projected motion vectors $SV_P$, the corresponding motion type classification $SC_P$, and the corresponding projected fidelity indicator $SF_P$ are then processed further by the post-filter process PF to generate filtered motion vectors $SV_F$ and corresponding filtered motion type classification $SC_F$.

The final interpolation process IP generates an output image SO according to the desired temporal position n+τ from at least the source image temporally adjacent at index n and at index n+1 in the source image signal SI. In addition, the filtered motion vector signal $SV_F$ and the filtered motion classification $SC_F$ are used to perform the interpolation by means of motion compensation.

It is not required for the different motion vector signals depicted in FIG. 3 to have a spatial resolution identical to the resolution of the input and output images. In an embodiment, the resolution of the estimated motion vector field is smaller than the image resolution for efficient implementations of the motion estimation process ME. A typical value is a relation of one vector in the signal $SV_M$ for an image block of 8×8 pixels in signal SI. After the vector projection process VP, the resolution can be increased again, e.g. to a relation of one vector in the signal $SV_P$ for an image block of 4×4 pixels. The post-filter process PF does usually not create additional resolution, so that the resolution of filtered motion vectors $SV_F$ will be identical to projected motion vectors $SV_P$.

Details of Fidelity Detection Process FD:

For the proposed improvement of the motion compensation method, a motion vector is always considered to be reliable enough to be included in the process of projecting it to the temporal position n+τ for which an intermediate image should be interpolated. However, each motion vector from the motion estimation process will be graded by means of a fidelity indicator before projecting it to the interpolation position. This has the benefit that only the fidelity indicator requires projection along with the corresponding motion vector, but not the inputs itself used to compute the fidelity indicator.

The fidelity indicator is calculated from basically two signals, the first being the residual error signal of the motion estimation process. This residual error is a separate value associated with each assigned motion vector and reflects the quality of the match. A typical embodiment for a motion estimation process is a block-based approach that minimizes the sum of absolute differences (SAD) between image regions displaced by a candidate motion vector. The residual error signal value is then the SAD value for the motion vector assigned to the respective image position.

A typical characteristic of block-based motion estimation is the reduced accuracy in determining the proper motion vector at the boundary of a foreground object moving over a background object. Usually, the object boundaries are not aligned with the match block grid, so that in those cases only a part of the match block contains pixels from the foreground object for which the motion is desired, while the other part contains non-matching pixels from the background, because the background moves with different motion than the foreground. As a consequence, while a low match error value usually indicates a good motion vector, a high match error value does not automatically indicate a bad motion vector, due to the aforementioned reasons. Therefore, another signal is required for the fidelity indication process.

This other signal can be derived from the general observation that object motion with high velocity results in a blurred object portrayal. This blurring effect is due to the beforehand image acquisition process requiring a minimum exposure time, which results in a temporal integration of all image content moving over a spatial position under observation. For the interior area of moving rigid objects this effect results in an object velocity-dependent but otherwise constant blurriness, while at the border area of moving objects an intermingling with other background objects occurs. This situation is another problem for a block-based motion estimator, i.e. to properly detect the right motion vectors for the foreground and the background objects, because the mixed image areas exist only in one of the previous and next source image, so that a match will fail and a wrong motion vector is detected.

For the above reasoning, the fidelity detector combines the motion vector magnitude derived from motion vector signal $SV_M$ with the matching error residual signal $SE_M$ to decide about the utility of the motion vector. The value "unstable" is assigned to a spatial position in signal $SF_I$, if the corresponding magnitude of the motion vector exceeds a first threshold, and the corresponding error residual exceeds a second threshold. Otherwise, the value "stable" is assigned to the remaining spatial positions in signal $SF_I$, which do not meet these conditions.

Details of Motion Vector Projection Process VP:

The objective of the motion vector projection process VP is the positioning of the motion vectors in signal $SV_M$ estimated for time index n and n+1 respectively to the desired interpolation position n+τ. This is especially important in case of spatial discontinuities in the motion vector field, i.e. borders between foreground and background objects moving along different trajectories. Otherwise, the interpolation process results in artifacts at the object borders if the motion description of an object does not overlap with its portrayal in the interpolated image. Similar to the transformation of estimated motion vector signal $SV_M$ into projected motion vector signal $SV_P$, the fidelity indicator signal $SF_I$ is transformed into the projected fidelity indicator signal $SF_P$.

For similar reasons, it is important to identify the type of motion present at each spatial position in the interpolated frame, so that the subsequent interpolation process selects the most suited interpolation method. Therefore, the motion classification signal $SC_P$ is generated, which contains a four-valued motion classification type corresponding to each projected motion vector in signal $SV_P$.

The four motion classification types detected by the vector projection process VP are "normal": The motion vector describes unambiguous motion of an image block that is visible in both source images, the previous image at time index n and the next image at time index n+1.

"occlusion": The motion vector describes motion of an image block that is visible only in the previous source image at time index n, but occluded in the next source image at time index n+1.

"exposure": The motion vector describes motion of an image block that is invisible in the previous source image at time index n, but exposed in the next source image at time index n+1.

"unknown": The motion vector describes motion that cannot be identified as one of "normal", "occlusion", or "exposure" motion types described above.

For the purpose of detecting the correct motion classification type, the motion vector projection process VP requires motion vector information from at least two points in time, at least one before and at least one after the desired interpolation time n+τ.

Several embodiments of motion estimation schemes are adequate for deriving the motion classification type.

One embodiment is described in [2], which employs two parallel but otherwise independent motion estimation processes. The first process estimates the displacements in temporally forward direction from time index n to time index n+1, while the second process estimates the displacements in temporally backward direction from time index n+1 to time index n.

Another embodiment described in [1] performs the motion classification based on a forward motion vector field between time index n and time index n+1 by extrapolating the vectors into time index n−1 and time index n+2 and analyzing the pixel values addressed by these vectors.

Figure 4:
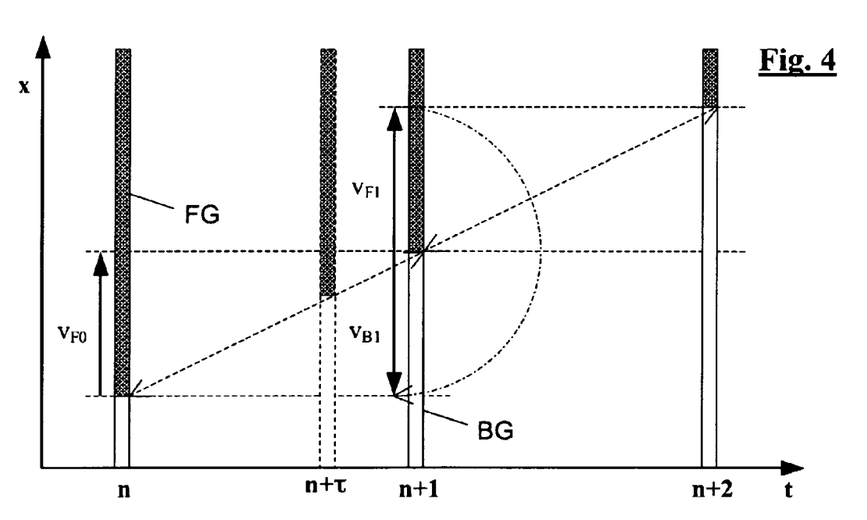
FIG. 4 shows an example where the displacement vectors are produced by a forward motion estimation process and the backward vector is derived by inversion of the forward vector.

In a third embodiment, a single motion estimation process is employed to detect both, forward and backward displacements, from two subsequent motion vector fields. For a motion estimation process, which detects the forward displacements from time index n to time index n+1, the forward motion vectors are used directly. The backward motion vectors are derived then by inverting the forward displacements from time index n+1 to time index n+2. In an alternative embodiment with a motion estimation process, which detects the backward displacements from time index n+1 to time index n, the backward motion vectors are used directly. The forward motion vectors are derived then by inverting the backward displacements from time index n to time index n−1. FIG. 4 depicts an example, where the displacement vectors $v_{F0}$ and $v_{F1}$ are produced by a forward motion estimation process, and the backward vector $v_{B1}$ is derived by inversion of forward vector $v_{F1}$.

Figure 5:
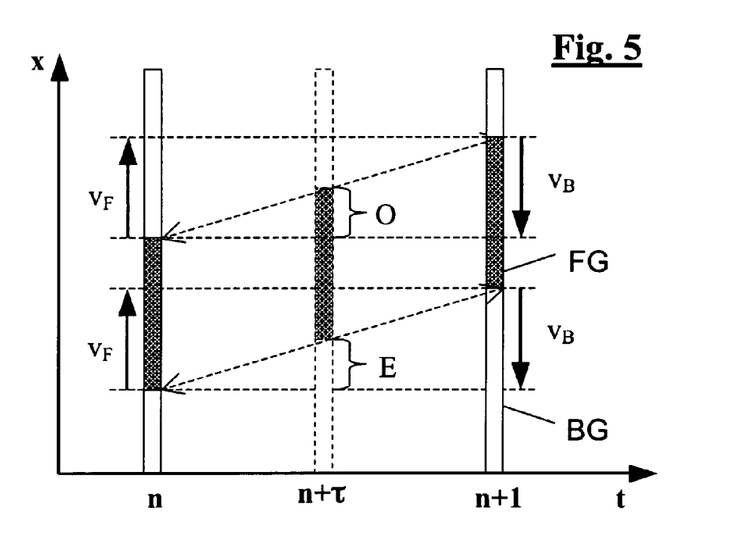
FIG. 5 shows the basic principle where the forward motion vector field at time index n and the backward motion vector field at time n+1 are both projected to the interpolation position n+τ.

The motion classification type can be constructed after establishing the forward displacements from time index n to time index n+1, and the backward displacements from time index n+1 to time index n with the motion estimation scheme of [1] or [2]. FIG. 5 depicts the basic principle, where the forward motion vector field at time index n and the backward motion vector field at time index n+1 are both projected to the interpolation position n+τ. The motion type "normal" is assigned to all spatial positions that contain equivalent matching motion vectors in both of these projections. The motion type "occlusion" is assigned to all spatial positions that contain motion vectors in only the forward vector projection. The motion type "exposure" is assigned to all spatial positions that contain motion vectors in only the backward vector projection. Finally, the motion type "unknown" is assigned to all remaining spatial position that received a motion vector in neither the forward nor the backward projection. In FIG. 5, the motion classification "normal" is assigned to all spatial positions except the sections O and E, where the motion classification "occluded" is assigned to the spatial positions in section O and "exposure" in section E respectively.

Figure 6:
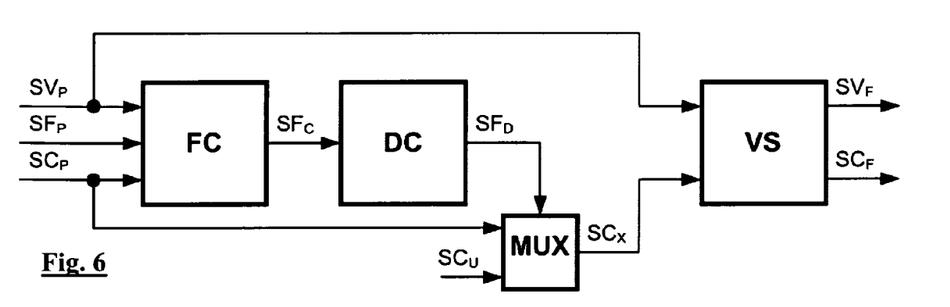
FIG. 6 shows processing units that can be included in the filtering unit PF shown in FIG. 3.

Details of Post-Filter Process PF:

The internals of the post-filter process PF will be explained by reference to FIG. 6. In a first step, the projected motion vector signal $SV_P$, the projected fidelity signal $SF_P$ and the projected motion classification $SC_P$ are combined by the fidelity combination process FC to generate the combined fidelity signal $SF_C$. The signal $SF_C$ is again a binary flag per spatial position with the two values "unstable" and "stable". The process FC combines any of the following events in a configurable manner for each spatial position in order to assign the value "unstable" for the output fidelity indicator SFC:

The input fidelity indicator in signal $SF_P$ has value "unstable".

The motion vector in signal $SV_P$ is the null vector representing no motion and the corresponding motion classification in signal $SC_P$ is any but motion type "normal".

The motion types of horizontally and vertically adjacent positions have value "unknown" or conflicting opposite values "occlusion" and "exposure".

Otherwise, the value "stable" is assigned to the output fidelity indicator $SF_C$ for all spatial positions, where the above conditions are not met.

In the next step, the fidelity indicator signal $SF_C$ is filtered by the process DC to produce the filtered fidelity indicator signal $SF_D$. The filtering process DC contains a combined morphological dilation and closing operation that enlarges the spatial areas marked with value "unstable". This is achieved by first setting all spatial positions adjacent to a position with value "unstable" also to value "unstable" and then filling in a horizontal and vertical manner the value "unstable" between all positions of value "unstable" not more than a configurable distance apart.

The dilated fidelity indicator signal $SF_D$ then controls the multiplexer MUX, which selects for each spatial position a value from either the projected motion classification signal $SC_P$ or the constant motion classification signal $SC_U$. The motion classification signal $SC_U$ has the same resolution as the projected motion classification signal $SC_P$, but has the motion type value "unknown" assigned to all spatial positions. For each spatial position, the value of the projected motion classification signal $SC_P$ is assigned to the output motion classification signal $SC_X$ if the fidelity indicator signal $SF_D$ has the value "stable" for the corresponding spatial position. Otherwise, the value of the constant motion classification signal $SC_U$ is assigned to the output motion classification signal $SC_X$ if the fidelity indicator signal $SF_D$ has the value "unstable" for the corresponding spatial position.

The projected motion vector signal $SV_P$ and the multiplexed motion classification signal $SC_X$ are processed further by the motion vector adjustment process VS to produce the filtered motion vector signal $SV_F$ and the filtered motion classification signal $SC_F$. The filtering process VS first determines the motion classification value with majority occurrence within a spatially defined neighborhood around each spatial position. This majority motion classification is assigned as a result to the filtered motion classification signal $SC_F$. The same majority motion classification is also used to select the subset of corresponding neighbor positions in the projected motion vector signal $SV_P$. The motion vectors from the neighborhood subset are used as input to an adjustment method to produce a resulting motion vector for each spatial position in the filtered motion vector signal $SV_F$. In one embodiment within the adjustment method the individual averages for the horizontal and vertical motion vector components are computed separately to derive the average horizontal and average vertical motion vector components. The average vector components are then recombined to be interpreted as the average motion vector for each neighborhood subset. Another embodiment is to use a rank-order filter (e.g. median filter) instead of an average filter in the procedure described above. Yet another embodiment is to enumerate the motion vectors in the neighborhood subset, e.g. by vector magnitude, vector direction, or other criteria, and then use a rank-order filter to select the representative motion vector for the neighborhood subset.

Details of the Interpolation Process IP:

The interpolation process IP generates an output image SO according to the desired temporal position n+τ from at least two source images, preferably the source image temporally adjacent at time index n and at index n+1 in the source image signal SI. In addition, the filtered motion vector signal $SV_F$ and the filtered motion classification $SC_F$ are used to perform the interpolation by means of motion compensation.

For each spatial position in the output image SO that is to be interpolated, the corresponding motion classification value is used to select a different interpolation method in effect. Each of those methods on their own are well known individually by prior art.

"normal": The corresponding motion vector is scaled by factor τ and added to the current spatial position coordinates of the output image to compute the spatial position in the previous input image at time index n, where a first image block is read from. Next, the corresponding motion vector is scaled by factor (τ−1) and added to the current spatial position coordinates of the output image to compute the spatial position in the next input image a time index n+1, where a second image block is read from. The two image blocks are processed by a weighting filter that weights their contribution to the filter result inversely proportional to their temporal distance τ and 1−τ respectively. The filter result is assigned to the current spatial position in the output image SO.

"unknown": The corresponding motion vector is scaled by factor τ and added to the current spatial position coordinates of the output image to compute the spatial position in the previous input image at time index n, where a first image block is read from. Next, the corresponding motion vector is scaled by factor (τ−1) and added to the current spatial position coordinates of the output image to compute the spatial position in the next input image a time index n+1, where a second image block is read from. A third and a fourth image block are read from the previous and the next input image respectively at the spatial position corresponding to the current spatial position in the output image SO, and then a weighted average of both blocks is assigned to a fifth image block. A rank-order filter selects one of the set of first, second, and fifth image block to be copied to the current spatial position in the output image SO.

"occlusion": The corresponding motion vector is scaled by factor τ and added to the current spatial position coordinates of the output image to compute the spatial position in the previous input image at time index n, where an image block is read from. This image block is copied to the current spatial position in the output image SO.

"exposure": The corresponding motion vector is scaled by factor (τ−1) and added to the current spatial position coordinates of the output image to compute the spatial position in the next input image a time index n+1, where an image block is read from. This image block is copied to the current spatial position in the output image SO.

In the Following a Brief Summary of Prior Art is Given:

For the motion compensation method presented in [1], the content of four subsequent images is used to determine the correct motion vectors estimated between the two central images, and decide whether image parts are obscured or revealed in the image to be interpolated.

The method proposed in [2] employs two parallel motion estimation processes that result in a forward motion vector field and a corresponding backward motion vector field. The forward and backward motion vectors are compared with an error criterion to decide which vector is used for the image to be interpolated.

In [3], a bi-directional block-based motion estimation process is to used for interlaced-to-progressive as well as for frame rate conversion. The motion estimation employed there delivers one, multiple, or no motion vector for each pixel in the frame to be interpolated. For each of this three cases a distinct interpolation method is used to produce the interpolated output pixels.

The video image upconversion method described in [4] perform detection of the correctness of motion vector to be used for motion compensation of each pixel, and replacing the interpolated pixel value by a previously recorded pixel value if the motion vector is considered incorrect.

The format converter and de-interlacer proposed in [5] uses bi-directional motion estimation between a previous and a next frame. Motion vectors with high match error are replaced by neighboring vectors with locally minimum match error. The resulting vectors are assigned to the interpolation frame, and the frame is interpolated by use of the assigned vectors.

REFERENCES

[1] G. A. Thomas, M. Burl, Video Image Processing, International Patent No. WO 92/05662, Apr. 2, 1992.
[2] G. de Haan, A. Pelagotti, Motion Vector Estimation and Detection of Covered/Uncovered Image Parts, International Patent No. WO 99/22520, May 6, 1999.
[3] D.-J. Wang, J.-J. Leou, A New Approach to Video Format Conversion Using Bidirectional Motion Estimation and Hybrid Error Concealment, Journal of Information Science and Engineering, Vol. 17, No. 5, pp. 763-777, September 2001.
[4] N. Dantwala, Method for Improving Accuracy of Block Based Motion Compensation, International Patent No. WO 02/49365, Jun. 20, 2002.
S.-H. Lee, S.-J. Ko, Format Converter Using Bi-directional Motion Vector and Method Thereof, U.S. Pat. No. 6,900,846, May 31, 2005.

REFERENCE SYMBOLS

| | |
|---|---|
| FD | fidelity detection unit |
| IP | interpolation unit |
| ME | motion estimation unit |
| MUX | multiplexing unit |
| PF | filtering unit |
| $SC_F$ | classification information |
| $SC_P$ | unfiltered classification information |
| $SC_U$ | constant motion classification information |
| $SC_X$ | multiplex classification information |
| $SE_M$ | residual error |
| $SF_C$ | combined fidelity information |
| $SF_D$ | filtered fidelity information |
| $SF_I$ | fidelity information |
| $SF_P$ | projected fidelity information |
| SI | image sequence |
| $SV_M$ | motion vector |
| $SV_P$ | projected motion vector |
| VP | projection unit |
| VS | adjustment unit |

The invention claimed is:

1. A method for processing image data, comprising:
performing a motion estimation process to obtain a motion vector that is descriptive for motion from a previous to a subsequent image of an input image sequence;
determining fidelity information for said motion vector, said fidelity information being descriptive for a level and accuracy of said motion estimation process;
projecting said motion vector to an interpolation position corresponding to an interpolated image that lies between said previous and subsequent image to obtain a projected motion vector;
projecting said fidelity information to said interpolation position to obtain projected fidelity information;
determining classification information for said projected motion vector, said classification information depending on said projected fidelity information, said classification information being descriptive for a motion type of said motion; and selecting an interpolation method in dependence of the determined classification information.

2. The method according to claim 1, wherein
a residual error is determined for each motion vector, and said fidelity information is determined based on said residual error and corresponding motion vector.

3. The method according to claim 1, wherein said fidelity information corresponds to 1 Bit of information.

4. The method according to claim 2, wherein said fidelity information takes on the value unstable if the magnitude of the corresponding motion vector exceeds a first threshold and the corresponding residual error exceeds a second threshold, and otherwise takes on the value stable.

5. The method according to claim 1, wherein said classification information takes on one of the following motion classification values, each representing a certain motion type:
   normal, in which case said motion vector describes unambiguous motion of an image block that is visible in said previous image and in said subsequent image,
   occlusion, in which case said motion vector describes motion of an image block that is visible only in said previous image and occluded in said subsequent image,
   exposure, in which case said motion vector describes motion of an image block that is not visible in said previous image and exposed in said subsequent image,
   unknown, in which case said motion vector describes motion that cannot be identified as normal, occlusion, or exposure.

6. The method according to claim 1, wherein said classification information is filtered classification information that is determined by filtering unfiltered classification information that is descriptive for the motion type of said motion.

7. The method according to claim 6, wherein said filtering of said unfiltered classification information comprises determining combined fidelity information that depends on at least one of said unfiltered classification information, said projected fidelity information, and said projected motion vector.

8. The method according to claim 7, wherein said combined fidelity information takes on the value unstable if:
   said projected fidelity information has the value unstable, or
   said projected motion vector corresponds to the null vector representing no motion and the motion classification value of said unfiltered classification information is different from normal, or
   the motion classification value of horizontally and vertically adjacent motion vectors have the value unknown or conflicting opposite values occlusion and exposure, and otherwise takes on the value stable.

9. The method according to claim 7, wherein said combined fidelity information is filtered to obtain filtered fidelity information, wherein said filtering of said combined fidelity information comprises a combined morphological dilation and closing operation that enlarges the spatial areas marked with value unstable.

10. The method according to claim 7, wherein said filtering of said unfiltered classification information comprises multiplexing said unfiltered classification information and constant motion classification information having the motion classification value unknown to obtain multiplexed classification information, wherein said multiplexing is dependent on at least one of said filtered fidelity information and said combined fidelity information.

11. The method according to claim 10, wherein said multiplexed classification information is equal to said unfiltered classification information if said filtered fidelity information has the value stable and otherwise is equal to said constant motion classification information.

12. The method according to claim 6, wherein said filtering of said unfiltered classification information comprises:
   determining the motion classification value with majority occurrence within a spatially defined neighborhood around each spatial position corresponding to said at least one motion vector; and
   setting said filtered classification information to the determined motion classification value with majority occurrence.

13. The method according to claim 12, further comprising:
   compensating motion based on a filtered motion vector that is determined by:
      selecting a subset of neighbor motion vectors of said projected motion vector, wherein said neighbor motion vectors have a motion classification value equal to the motion classification value with majority occurrence, and
      using said subset of neighbor motion vectors as an input to an adjustment method to obtain said filtered motion vector.

14. The method according to claim 13, wherein said adjustment method comprises:
   computing individual averages for horizontal and vertical motion vector components separately to derive average horizontal and average vertical motion vector components; and
   recombining the average vector components to be interpreted as the average motion vector for each neighborhood subset.

15. The method according to claim 13, wherein said adjustment method comprises:
   computing individual median values for horizontal and vertical motion vector components separately to derive median horizontal and median vertical motion vector components; and
   recombining the median vector components to be interpreted as median filtered motion vector for each neighborhood subset.

16. The method according to claim 13, wherein said adjustment method comprises:
   enumerating the motion vectors within said subset; and
   using a rank-order filter to select the representative motion vector for said subset.

17. The method according to claim 1, further comprising:
   increasing resolution after projecting at least one of said motion vector and said fidelity information.

18. A signal processing system adapted for performing the method according to claim 1.

19. A non-transitory computer-readable storage medium including computer executable instructions, wherein the instructions, when executed by a computer, cause the computer to perform a method for processing image data, the method comprising:
   performing a motion estimation process to obtain a motion vector that is descriptive for motion from a previous to a subsequent image of an input image sequence;
   determining fidelity information for said motion vector, said fidelity information being descriptive for a level and accuracy of said motion estimation process;

projecting said motion vector to an interpolation position corresponding to an interpolated image that lies between said previous and subsequent image to obtain a projected motion vector;

projecting said fidelity information to said interpolation position to obtain projected fidelity information;

determining classification information for said projected motion vector, said classification information depending on said projected fidelity information, said classification information being descriptive for a motion type of said motion; and selecting an interpolation method in dependence of the determined classification information.

20. A signal processor for processing image data, comprising:

a motion estimation unit configured to perform motion estimation to obtain a motion vector that is descriptive for motion from a previous to a subsequent image of an input image sequence;

a fidelity detection unit configured to determine fidelity information for said motion vector, said fidelity information being descriptive for a level and accuracy of said motion estimation;

a projection unit configured to project said motion vector to an interpolation position corresponding to an interpolated image that lies between said previous and subsequent image to obtain a projected motion vector, said projection unit being configured to project said fidelity information to said interpolation position to obtain projected fidelity information, said filtering unit being configured to determine said classification information based on said projected fidelity information;

a filtering unit configured to determine classification information for said projected motion vector, said classification information depending on said projected fidelity information, said classification information being descriptive for a motion type of said motion; and an interpolation unit configured to select an interpolation method in dependence of the determined classification information.

21. The signal processor according to claim 20, wherein the motion estimation unit is further configured to determine a residual error for each motion vector, wherein said fidelity information is determined based on said residual error and corresponding motion vector.

22. The signal processor according to claim 20, wherein said fidelity information corresponds to 1 Bit of information.

23. The signal processor according to claim 21, wherein said fidelity information takes on the value unstable if the magnitude of the corresponding motion vector exceeds a first threshold and the corresponding residual error exceeds a second threshold, and otherwise takes on the value stable.

24. The signal processor according to claim 20, wherein said classification information takes on one of the following motion classification values, each representing a certain motion type:

normal, in which case said motion vector describes unambiguous motion of an image block that is visible in said previous image and in said subsequent image, occlusion, in which case said motion vector describes motion of an image block that is visible only in said previous image and occluded in said subsequent image, exposure, in which case said motion vector describes motion of an image block that is not visible in said previous image and exposed in said subsequent image, unknown, in which case said motion vector describes motion that cannot be identified as normal, occlusion, or exposure.

25. The signal processor according to claim 20, wherein said classification information is filtered classification information and said filtering unit is configured to filter unfiltered classification information that is descriptive for the motion type of said motion to obtain said filtered classification information.

26. The signal processor according to claim 25, wherein said filtering unit is configured to determine combined fidelity information that depends on at least one of said unfiltered classification information, said projected fidelity information, and said projected motion vector.

27. The signal processor according to claim 26, wherein said combined fidelity information takes on the value unstable if:

said projected fidelity information has the value unstable, or said projected motion vector corresponds to the null vector representing no motion and the motion classification value of said unfiltered classification information is different from normal, or the motion classification value of horizontally and vertically adjacent motion vectors have the value unknown or conflicting opposite values occlusion and exposure, and otherwise the value stable.

28. The signal processor according to claim 26, wherein said filtering unit is configured to filter said combined fidelity information to obtain filtered fidelity information, wherein said filtering of said combined fidelity information comprises a combined morphological dilation and closing operation that enlarges the spatial areas marked with the value unstable.

29. The signal processor according to claim 26, further comprising:

a multiplexing unit configured to multiplex said unfiltered classification information and constant motion classification information having the motion classification value unknown to obtain multiplexed classification information, wherein said multiplexing is dependent on at least one of said filtered fidelity information and said combined fidelity information.

30. The signal processor according to claim 29, wherein said multiplexing unit is controlled such that said multiplexed classification information is equal to said unfiltered classification information if said filtered fidelity information has the value stable and otherwise is equal to said constant motion classification information.

31. The signal processor according to claim 26, further comprising:

an adjustment unit configured to determine the motion classification value with majority occurrence within a spatially defined neighborhood around each spatial position corresponding to said at least one motion vector, and set said filtered classification information to the determined motion classification value with majority occurrence.

32. The signal processor according to claim 31, wherein said interpolation unit is configured to compensate motion based on a filtered motion vector that is determined by said adjustment unit by selecting a subset of neighbor motion vectors of said projected motion vector, wherein said neighbor motion vectors have a motion classification value equal to the motion classification value with majority occurrence, and using said subset of neighbor motion vectors as an input to an adjustment method to obtain said filtered motion vector.

33. The signal processor according to claim 32, wherein said adjustment unit computes individual averages for the horizontal and vertical motion vector components separately to derive average horizontal and average vertical motion vector components, and recombines said average vector components to be interpreted as the average motion vector for each neighborhood subset.

34. The signal processor according to claim 32, wherein said adjustment unit computes individual median values for the horizontal and vertical motion vector components separately to derive median horizontal and median vertical motion vector components, and recombines the median vector components to be interpreted as median filtered motion vector for each neighborhood subset.

35. The signal processor according to claim 32, wherein said adjustment unit enumerates the motion vectors within said subset, and uses a rank-order filter to select the representative motion vector for said subset.

36. The method according to claim 1, wherein said motion vector is projected to an interpolation position at (n+$\tau$), wherein $0<\tau<1$.

37. The signal processor according to claim 20, wherein the interpolation position corresponds to a temporal position (n+$\tau$), wherein $0<\tau<1$.

* * * * *